(12) United States Patent
Coan et al.

(10) Patent No.: US 9,253,735 B2
(45) Date of Patent: Feb. 2, 2016

(54) DETERMINING MAXIMUM POWER REDUCTION (MPR) FOR MULTI-CLUSTER WIRELESS TRANSMISSIONS

(71) Applicant: QUALCOMM Incorporated, San Diego, CA (US)

(72) Inventors: Philip David Coan, San Diego, CA (US); Paul Joseph Draxler, San Diego, CA (US); In Hyuck Yeo, Bellevue, WA (US)

(73) Assignee: QUALCOMM INCORPORATED, San Diego, CA (US)

( * ) Notice: Subject to any disclaimer, the term of this patent is extended or adjusted under 35 U.S.C. 154(b) by 147 days.

(21) Appl. No.: 14/043,648

(22) Filed: Oct. 1, 2013

(65) Prior Publication Data

US 2014/0092838 A1 Apr. 3, 2014

Related U.S. Application Data

(60) Provisional application No. 61/708,995, filed on Oct. 2, 2012.

(51) Int. Cl.
*H04W 4/00* (2009.01)
*H04W 52/24* (2009.01)
*H04W 28/18* (2009.01)
*H04W 52/36* (2009.01)
*H04B 1/04* (2006.01)
*H04W 52/32* (2009.01)
*H04W 52/00* (2009.01)

(52) U.S. Cl.
CPC ........... *H04W 52/243* (2013.01); *H04B 1/0475* (2013.01); *H04W 28/18* (2013.01); *H04W 52/00* (2013.01); *H04W 52/327* (2013.01); *H04W 52/367* (2013.01); *Y02B 60/50* (2013.01)

(58) Field of Classification Search
USPC ........... 370/329, 352; 455/509; 709/224, 226; 718/105
See application file for complete search history.

(56) References Cited

U.S. PATENT DOCUMENTS

| 8,462,724 | B1 * | 6/2013 | Immonen et al. | 370/329 |
| 8,817,754 | B2 * | 8/2014 | Ko et al. | 370/335 |
| 2009/0191910 | A1 * | 7/2009 | Athalye et al. | 455/522 |
| 2010/0029289 | A1 * | 2/2010 | Love et al. | 455/450 |
| 2010/0255868 | A1 * | 10/2010 | Lee et al. | 455/509 |

(Continued)

FOREIGN PATENT DOCUMENTS

| WO | 9735385 A1 | 9/1997 |
| WO | 2008077540 A2 | 7/2008 |

(Continued)

OTHER PUBLICATIONS

Iwai T., et al., "System Performance of Clustered DFT-S-OFDM Considering Maximum Allowable Transmit Power," IEEE International Conference on Communications (ICC), 2011, pp. 1-5.

(Continued)

*Primary Examiner* — Phuongchau Ba Nguyen
(74) *Attorney, Agent, or Firm* — Seyfarth Shaw LLP

(57) ABSTRACT

A method of wireless communication includes determining spectral positions of intermodulation distortion products for a multi-cluster transmission. The method also includes mapping the spectral positions to corresponding spectral regions. The method further includes determining a maximum power reduction value of the multi-cluster transmission based on the corresponding spectral regions.

18 Claims, 15 Drawing Sheets

(56) References Cited

U.S. PATENT DOCUMENTS

| | | |
|---|---|---|
| 2012/0075989 A1 | 3/2012 | Roessel et al. |
| 2013/0044621 A1 | 2/2013 | Jung et al. |

FOREIGN PATENT DOCUMENTS

| | | |
|---|---|---|
| WO | 2011158560 A1 | 12/2011 |
| WO | 2012097738 A1 | 7/2012 |

OTHER PUBLICATIONS

International Search Report and Written Opinion—PCT/US2013/063119—ISAEPO—Jan. 3, 2014.

Qualcomm Incorporated: "A-MPR for NS_04", 3GPP Draft; R4-103063, 3rd Generation Partnership Project (3GPP), Mobile Competence Centre; 650, Route Des Lusioles; F-06921 Sophia-Antipolis Cedex; France, vol. RAN WG4, No. Madrid, Spain; 20100823, Aug. 19, 2010, XP050454333.

\* cited by examiner

DETERMINING MAXIMUM POWER REDUCTION (MPR) FOR MULTI-CLUSTER WIRELESS TRANSMISSIONS

CROSS-REFERENCE TO RELATED APPLICATION

This application claims the benefit under 35 U.S.C. §119(e) to U.S. Provisional Patent Application No. 61/708,995 entitled "DETERMINING MAXIMUM POWER REDUCTION (MPR) FOR MULTI-CLUSTER WIRELESS TRANSMISSIONS," filed on Oct. 2, 2012, the disclosure of which is expressly incorporated by reference herein in its entirety.

BACKGROUND

1. Field

Aspects of the present disclosure relate generally to wireless communication systems, and more particularly to power control in wireless systems, such as long term evolution (LTE) systems.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

In one aspect of the present disclosure, a method of wireless communication is presented. The method includes determining spectral positions of intermodulation distortion products for a multi-cluster transmission. The method also includes mapping the spectral positions to corresponding spectral regions. The method further includes determining a maximum power reduction value of the multi-cluster transmission based on the corresponding spectral regions.

Another aspect of the present disclosure is directed to an apparatus including means for determining spectral positions of intermodulation distortion products for a multi-cluster transmission. The apparatus also includes means for mapping the spectral positions to corresponding spectral regions. The apparatus further includes means for determining a maximum power reduction value of the multi-cluster transmission based on the corresponding spectral regions.

In yet another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of determining spectral positions of intermodulation distortion products for a multi-cluster transmission. The program code also causes the processor(s) to map the spectral positions to corresponding spectral regions. The program code further causes the processor(s) to determine a maximum power reduction value of the multi-cluster transmission based on the corresponding spectral regions.

Another aspect of the present disclosure is directed to a wireless communication apparatus having a memory and at least one processor coupled to the memory. The processor(s) is configured to determine spectral positions of intermodulation distortion products for a multi-cluster transmission. The processor(s) is also configured to map the spectral positions to corresponding spectral regions. The processor(s) is further configured to determine a maximum power reduction value of the multi-cluster transmission based on the corresponding spectral regions.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
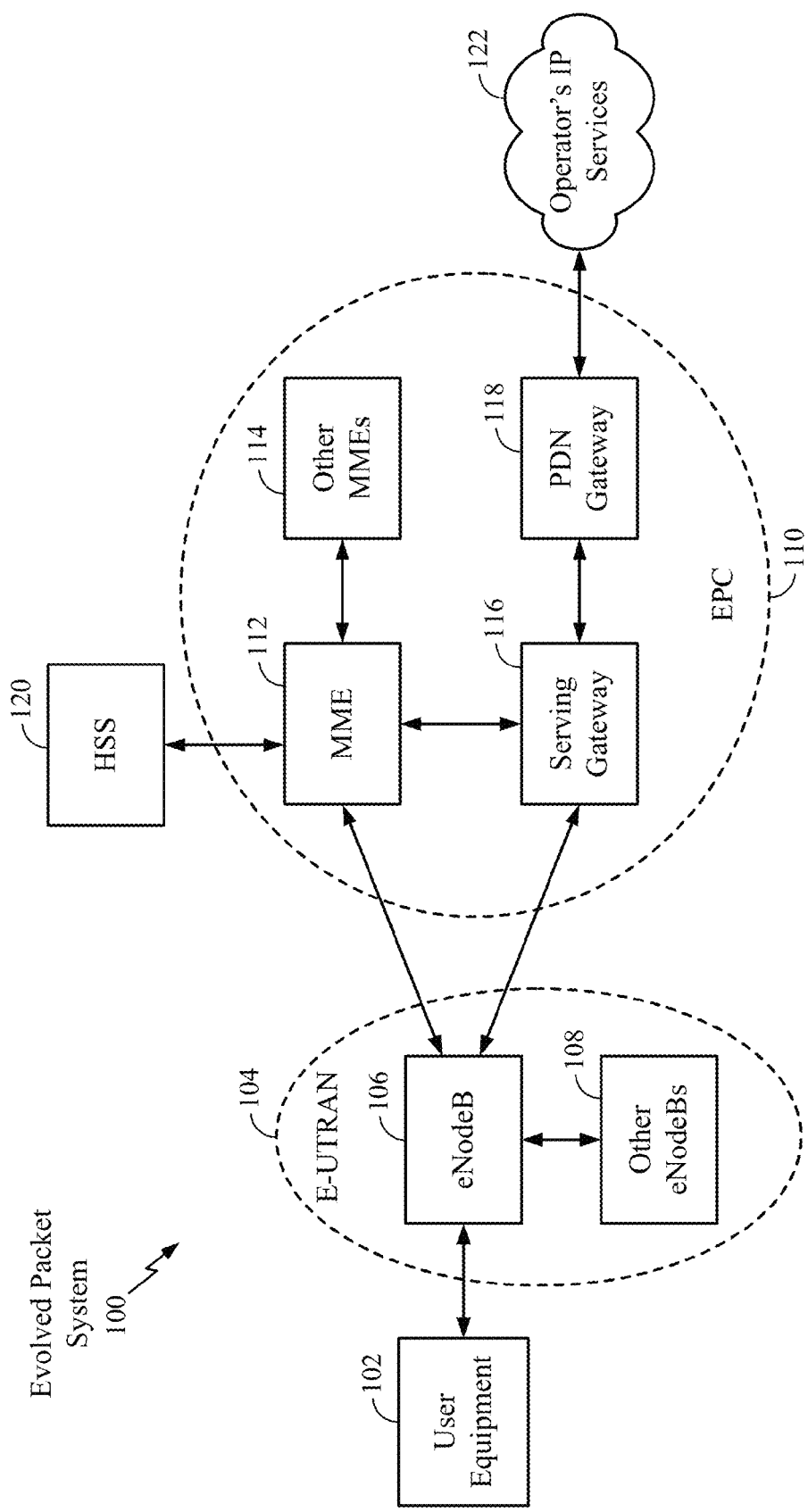
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
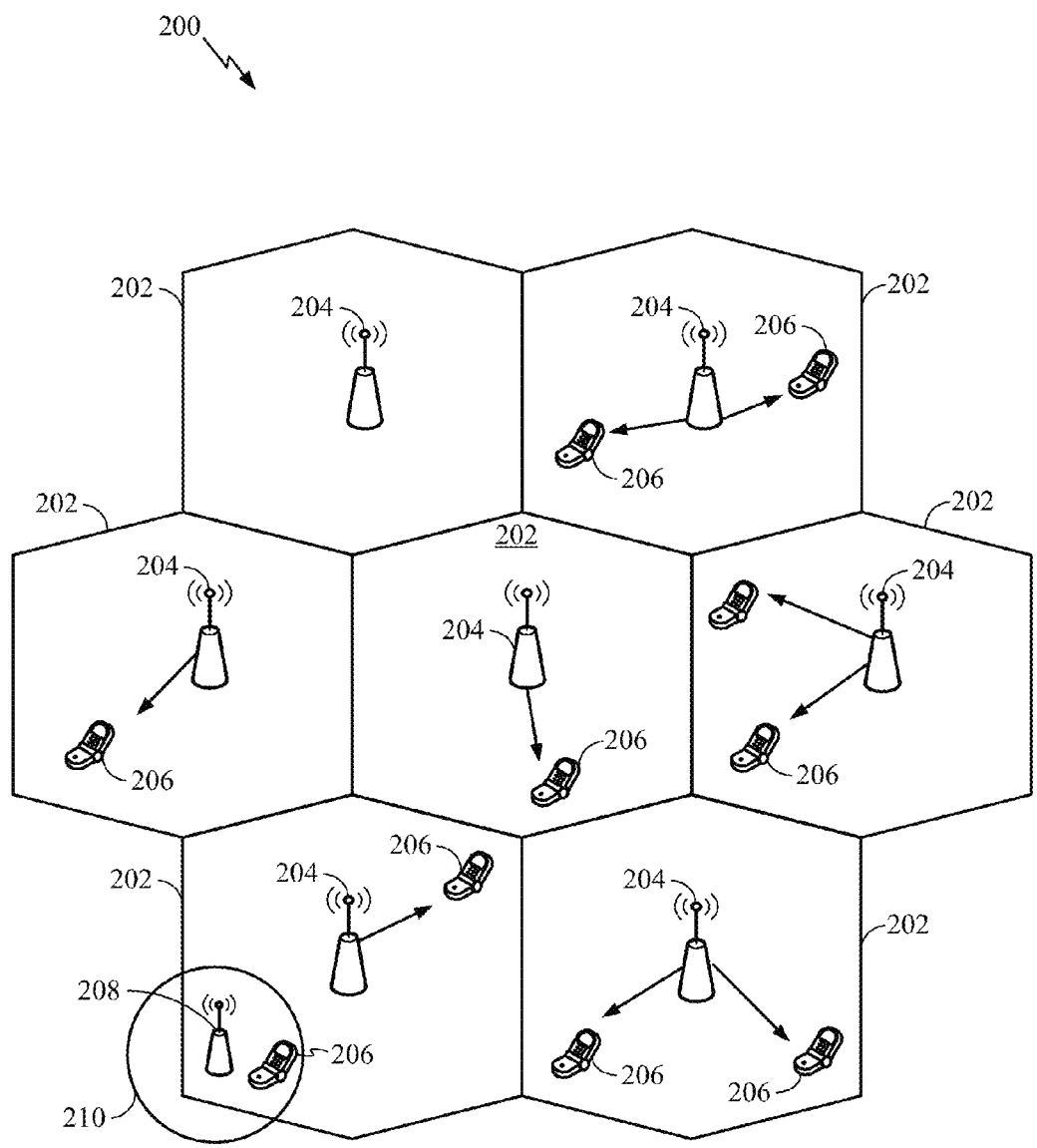
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
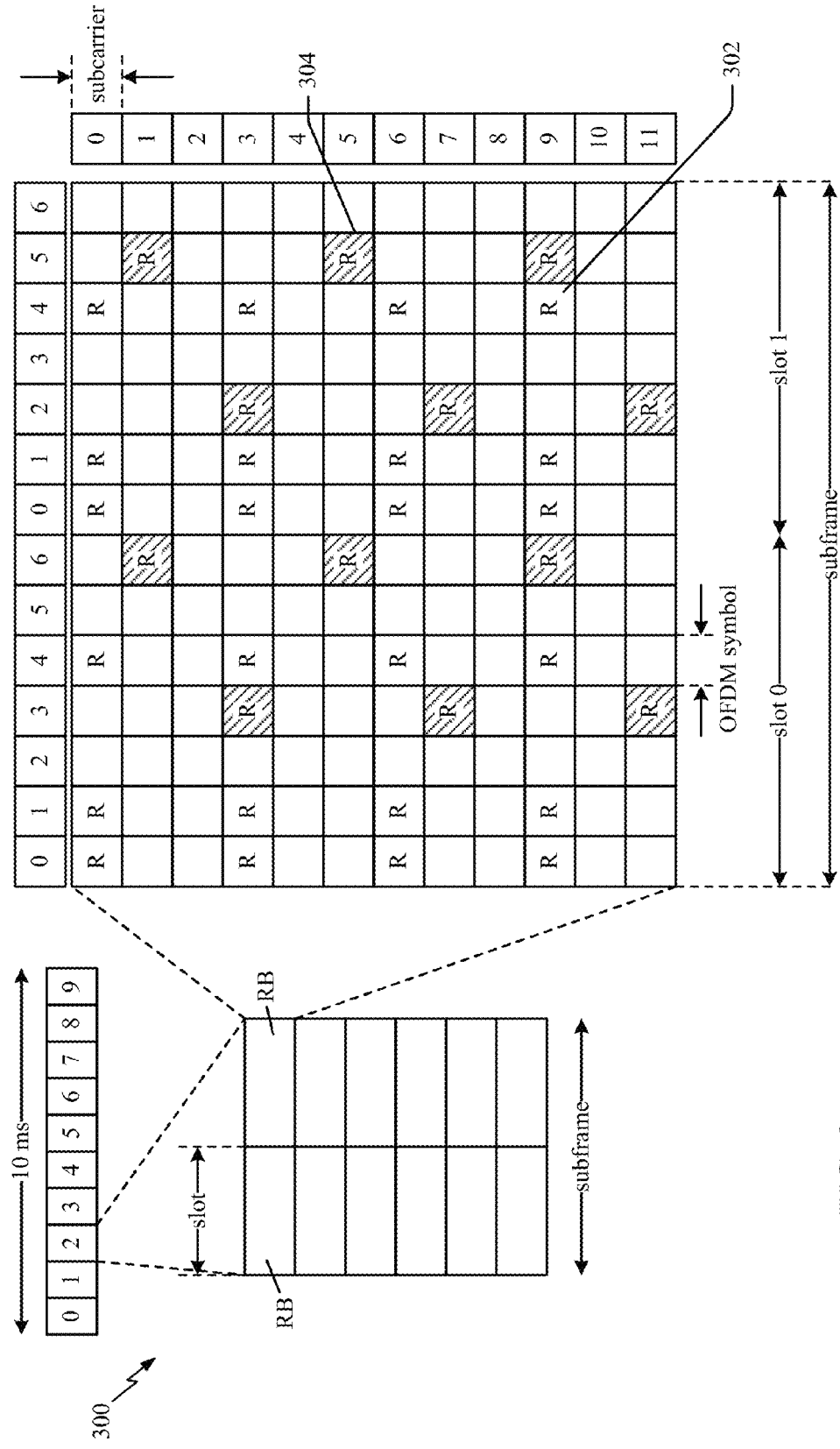
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
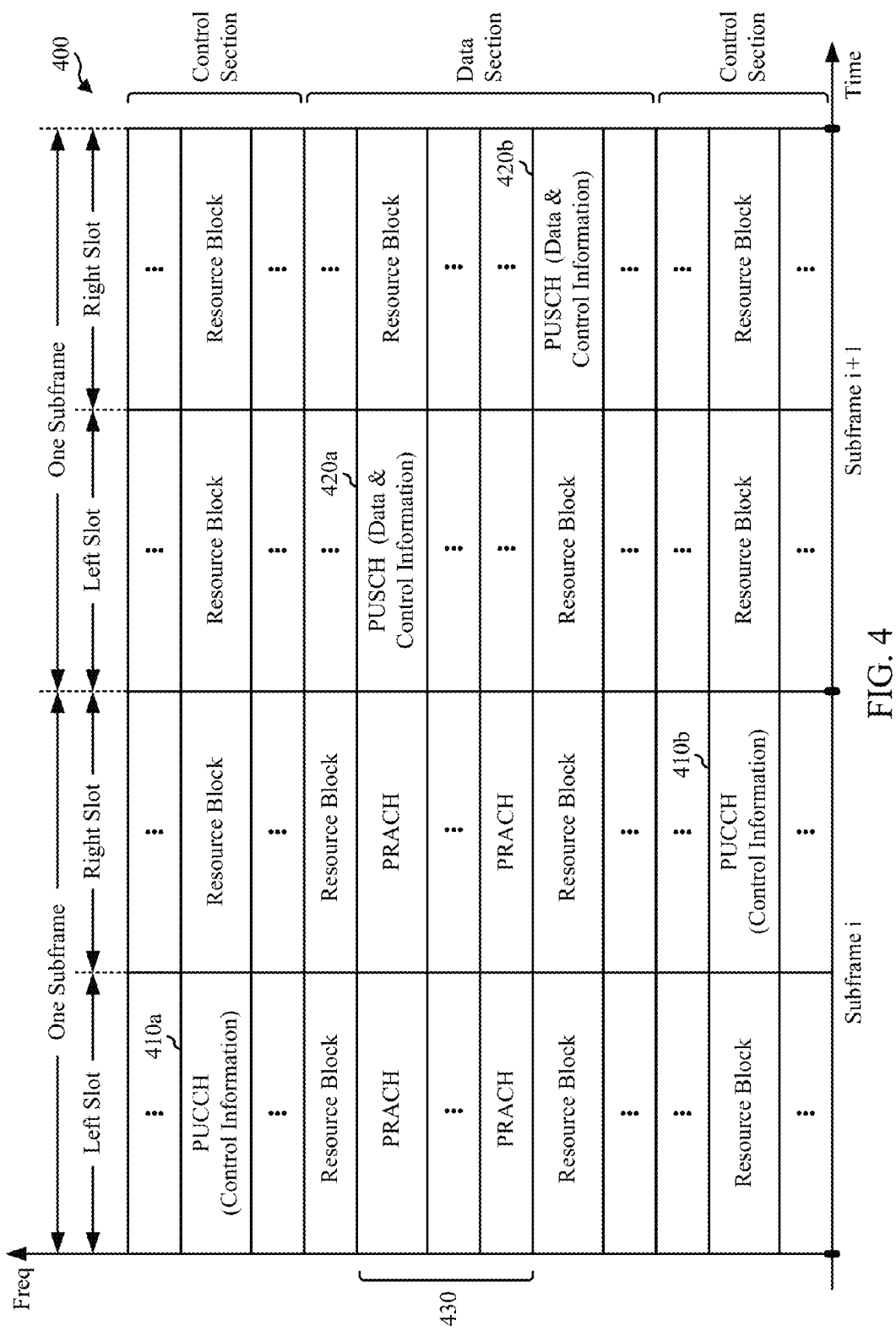
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
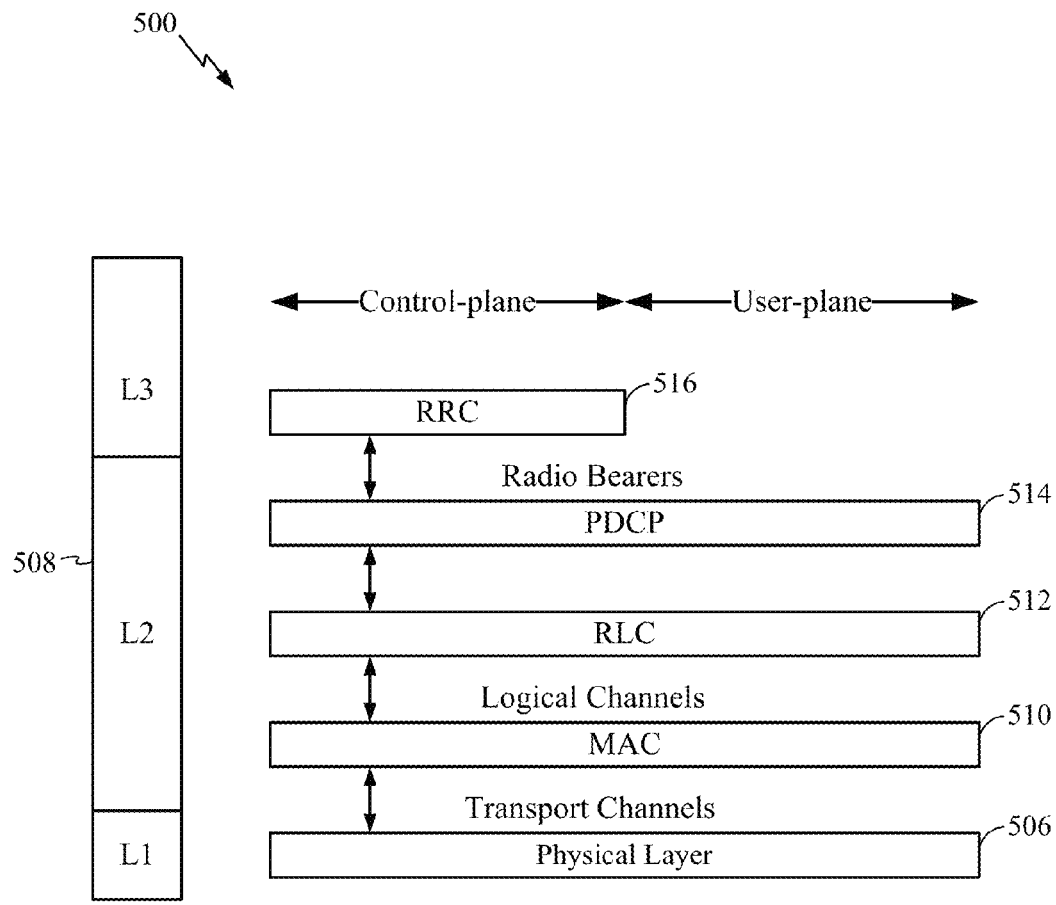
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
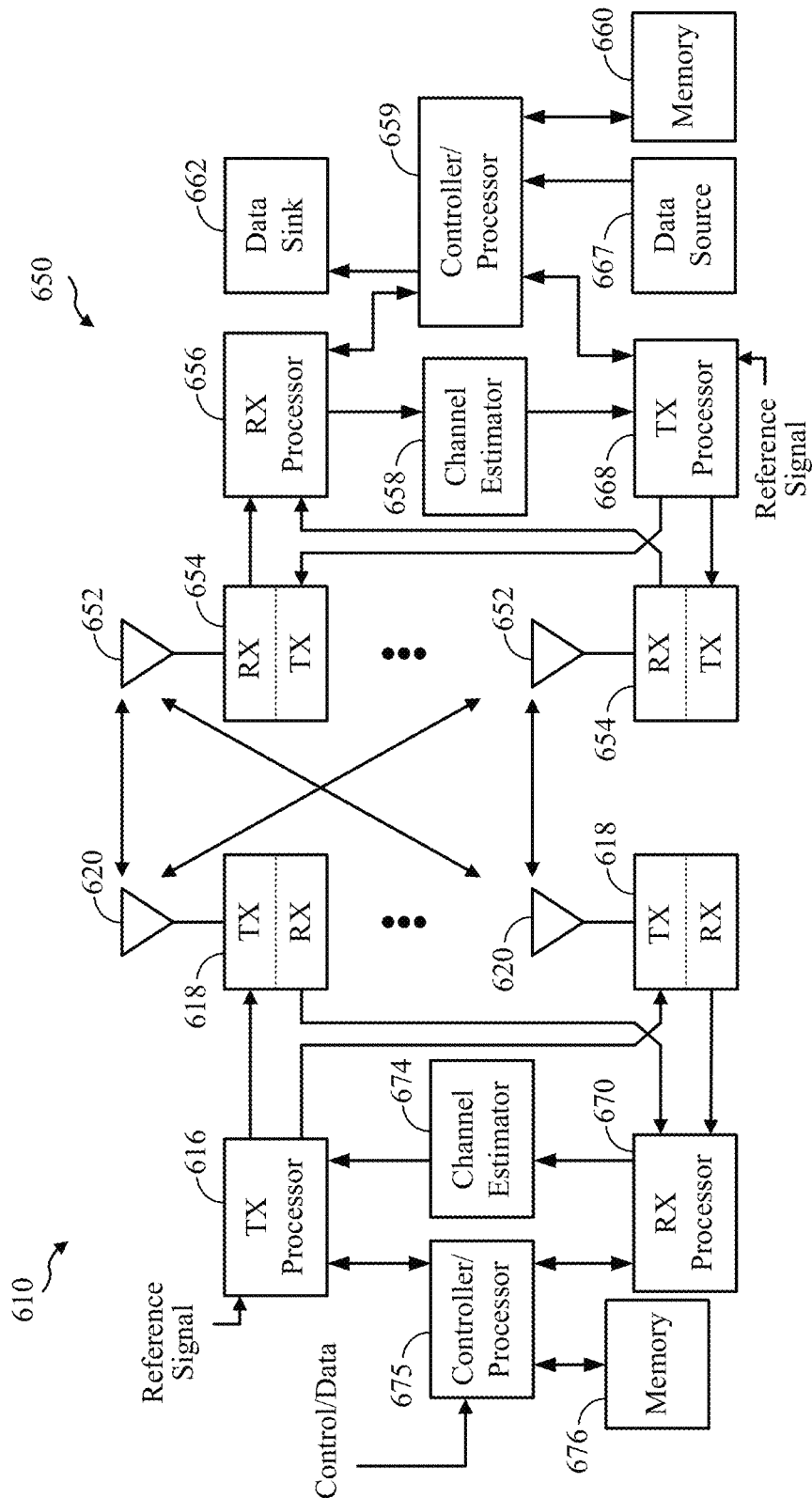
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Determining MPR for Wireless Communication Systems

Wireless communication standards, such as the 3GPP standard, define a maximum power reduction (MPR) value for a user equipment (UE) to lower its maximum output power to meet a specified signal quality value and/or out of band (OOB) emissions value. In a typical system, the maximum power reduction value is a function of the modulation scheme, the channel bandwidth, and the transmission bandwidth (e.g., the number of transmitted resource blocks).

In some cases, the 3GPP standard specifies wireless transmissions via noncontiguous clusters. The transmission of noncontiguous clusters in some networks, such as LTE networks, may produce interference in adjacent frequency channels because of increased out of band emissions. In some cases, the increased out band emissions are caused by intermodulation distortion due to non-linearity of the transmitter power amplifier. In some networks, such as LTE networks, out of band emissions are defined using a first spectrum emission mask (SEM), a second spectrum emission mask, and an adjacent channel leakage ratio.

Spurious emissions occur outside of the bandwidth used for transmission and are caused by a variety of non-ideal effects, such as, for example, harmonic emissions and/or intermodulation products. Both out of band emissions and spurious emissions due to intermodulation distortion are generated at specific frequencies. The specific frequencies depend on the cluster separation. As the frequency separation between clusters increases, the intermodulation distortion spread increases and the specified maximum power reduction increases (e.g., becomes more stringent).

A typical amplifier is a non-linear device that may produce undesirable intermodulation products. The intermodulation products may include the sum and difference of the cluster frequencies F1 and F2 at multiples of the sum and difference frequencies, such as 2F1−F2 or 3F1−2F2. In some cases, the order of the intermodulation products may be calculated by adding the constants used to multiply cluster frequencies F1 and F2 in the intermodulation product. In one configuration, (2F1−F2) is a third order intermodulation product and (3F1−2F) is a fifth order intermodulation product.

Wireless communication standards, such as the 3GPP standard, determine the maximum power reduction values based on a total number of active resource blocks for multi-cluster waveforms. In some cases, when the number of active resource blocks is reduced, the maximum power reduction value is increased. In a typical network, the maximum power reduction may degrade network performance due to increased power reduction by UEs.

Aspects of the present disclosure define a maximum power reduction based on a number of resource blocks to be transmitted and additional criteria. In one configuration, the maximum power reduction is determined using formulas for estimating locations of the third and fifth order products created by multi-clusters. The formula accounts for gap information, edge information, and balance information for each of the resource blocks of the clusters. Based on aspects of the present disclosure, unnecessary power reductions by the UE are mitigated and UE throughput and network capacity are improved.

Figure 7:
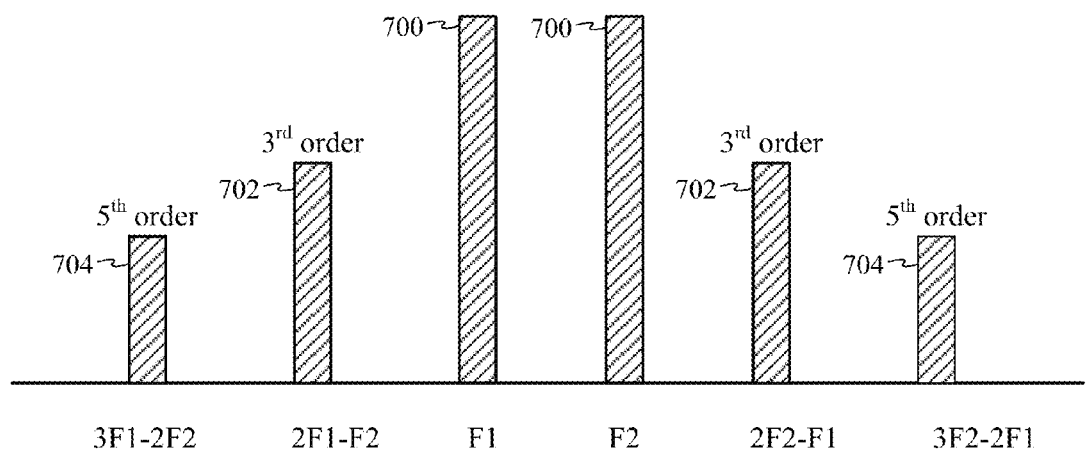
FIG. 7 is a diagram illustrating a multi-cluster transmission spectrum and its associated intermodulation distortion products.

FIG. 7 shows a spectrum 700 of two clusters F1, F2. FIG. 7 further illustrates the third order intermodulation distortion products 702 and the fifth order intermodulation distortion products 704 associated with the two clusters F1, F2. The position of the third order intermodulation distortion products 702 and fifth order intermodulation distortion products 704 are shown as a function of the center frequencies of the two clusters F1, F2. For example, the center frequencies of third order intermodulation distortion products 702 are generally 2F1−F2 and 2F2−F1. The center frequencies of the fifth order intermodulation distortion products 704 are generally 3F1−2F2 and 3F2−2F1.

Figure 8:
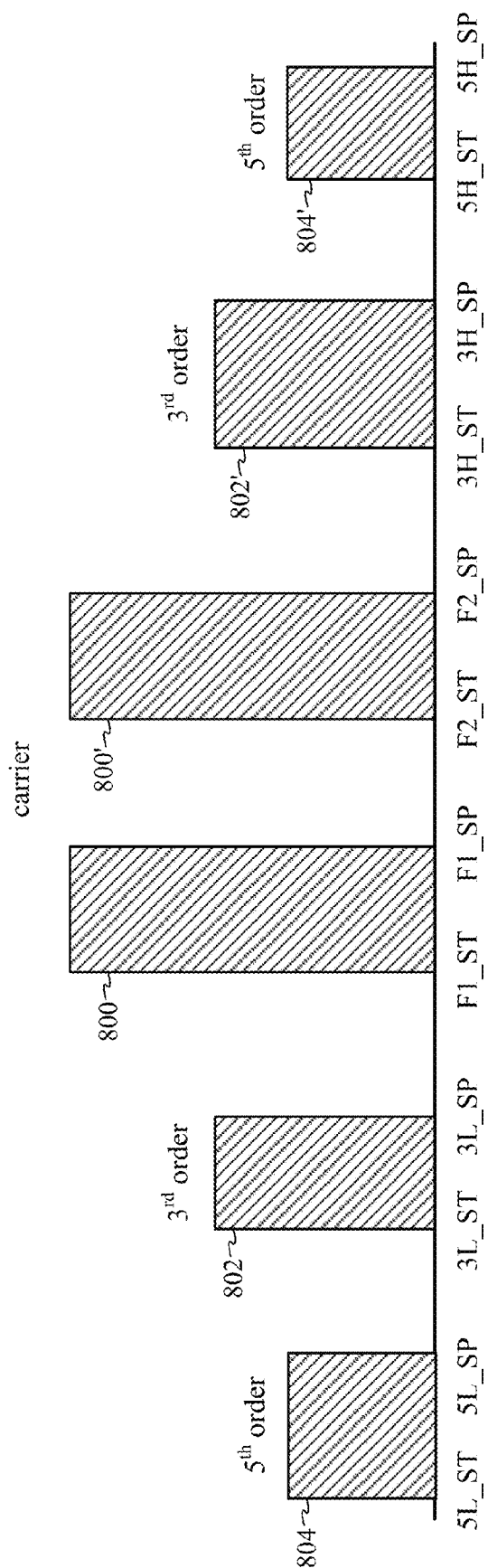
FIG. 8 is a diagram illustrating a multi-cluster transmission spectrum and boundaries of its associated intermodulation distortion products.

Aspects of the present disclosure provide improved predictions of the locations of the third order and fifth order intermodulation distortion products including predictions of their gaps and bandwidth. FIG. 8 shows positions of two clusters 800, 800'. FIG. 8 further illustrates the associated third order intermodulation distortion products 802, 802' and the fifth order intermodulation distortion products 804, 804'. In one configuration, the positions of the third order intermodulation distortion products 802, 802' and the fifth order intermodulation distortion products 804, 804' are determined based on bandwidth boundaries of the associated clusters 800, 800'. In one configuration, the lower boundary of the first (lower frequency) cluster 800 is represented by the first cluster start index (F1_ST) and the upper boundary of the first cluster 800 is represented by the first cluster stop index (F1_SP). Additionally, in the present configuration, the lower boundary of the second (upper frequency) cluster 800' is represented by the second cluster start index (F2_ST) and the upper boundary of the second cluster 800' is represented by the second cluster stop index (F2_SP).

According to an aspect of the present disclosure, the lower boundary of the lower third order intermodulation distortion product 802 is represented by the index (3L_ST) and the upper boundary of the lower third order intermodulation distortion product 802 is represented by the index (3L_SP). Additionally, in the present configuration, the lower boundary of the lower fifth order intermodulation distortion product 804 is represented by the index (5L_ST) and the upper boundary of the lower fifth order intermodulation distortion product 804 is represented by the index (5L_SP). Moreover, in the present configuration, the lower boundary of the upper third order intermodulation distortion product 802' is represented by the index (3H_ST) and the upper boundary of the upper third order intermodulation distortion product 802' is represented by the index (3H_SP). Furthermore, in the present configuration, the lower boundary of the upper fifth order intermodulation distortion product 804' is represented by the index (5H_ST) and the upper boundary of the upper fifth order intermodulation distortion product 804' is represented by the index (5H_SP). Finally, in the present configuration, the frequency offset values defining boundary positions of the third order intermodulation and the fifth order intermodulation distortion products are predicted by the following equations:

$$3L\_ST = 2 \times F1\_ST - F2\_SP \quad (1)$$

$$3L\_SP = 2(F1\_SP+1) - F2\_ST \quad (2)$$

$$5L\_ST = 2 \times 3L\_ST - F1\_SP \quad (3)$$

$$5L\_SP = 2 \times 3L\_SP - F1\_ST \quad (4)$$

$$3H\_ST = 2 \times F2\_SP - F1\_ST \quad (5)$$

$$3H\_SP = 2 \times F2\_ST - (F1\_SP+1) \quad (6)$$

$$5H\_SP = 2 \times 3H\_SP - F2\_ST \quad (7)$$

$$5L\_SP = 2 \times 3H\_ST - F2\_SP \quad (8)$$

Figure 9:
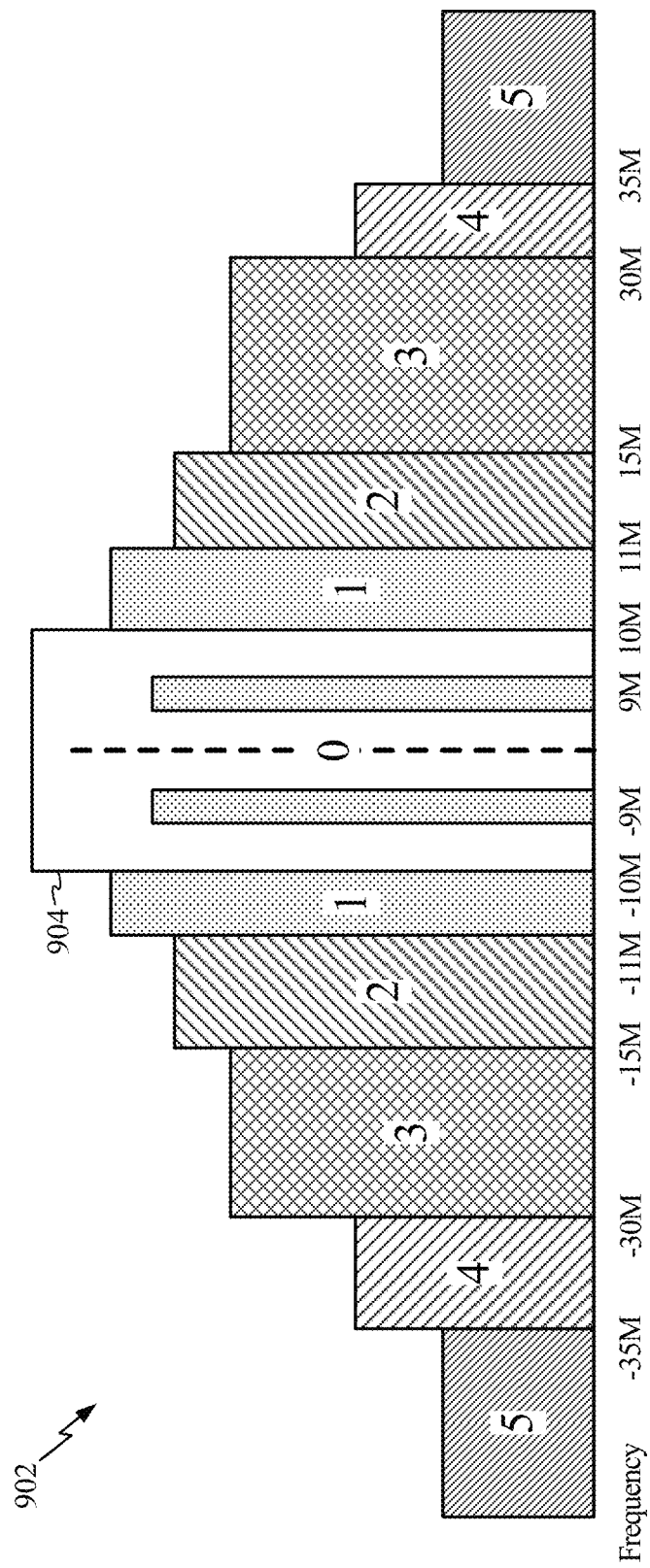
FIG. 9 is a diagram illustrating a region index mapping based on frequency offsets of intermodulation distortion products according to an aspect of the present disclosure.

According to an aspect of the present disclosure, after calculating the frequency offset values that define spectral positions of the third and fifth order intermodulation distortion products using EQUATIONS 1-8, the spectral positions are mapped to a spectral region index using the calculated frequency offset. The spectral region index boundaries may vary depending on the number of resource blocks being transmitted. FIG. 9 illustrates a frequency mapping to a resource block (RB) index for a spectrum emission mask, according to an aspect of the present disclosure.

In one configuration, as shown in FIG. 9, the region index values may be based on frequency offsets in a spectrum emission mask 902. In this configuration, five regions (1-5) are defined on each side of a channel 904. The channel 904 may be a 20 MHz channel. As shown in FIG. 9, the channel 904 is region zero. Based on the RB Index, the RB index for the channel 904 begins from 1 RB and may increase to 100 RB depending on the channel bandwidth. In one configuration, based on a frequency and assuming a channel bandwidth for the channel 904 is 20 MHz (−10 MHZ to 10 MHz), the first RB begins at 9 MHz below the center frequency, fc −9 MHz, and last RB index, 100, is 9 MHz above the center frequency, fc +9 MHz.

In yet another configuration, non-linearity of the power amplifier may be determined, for example during calibration. The amount of non-linearity could then be factored into the MPR determination.

According to one aspect of the present disclosure, a region index value for each of the intermodulation distortion products is determined based on calculation of the outer spectral boundaries of third order products (3L_ST and 3H_SP) and the outer spectral boundaries of the fifth order products (5L_ST and 5H_SP). For example, as shown in FIG. 9, if the calculated frequency offset of the outer boundary of the lower third order intermodulation product (3L_ST) is between −15 MHz and −11 MHz, then the region index of the lower third order intermodulation distortion product is two. Stated another way, based on the RB index, if lower third order intermodulation product (3L_ST) is between −33 to −10 RBs, then the region index is two.

Although the present configuration is described with reference to the outside boundaries of respective intermodulation products, aspects of the present disclosure are also contemplated for assigning region boundaries based on center frequencies or inner boundaries of the intermodulation distortion products. The boundaries of each region may vary depending on the number of transmitted resource blocks, for example. In one configuration, the boundaries of the regions are fixed, in terms of RBs. Still, the signal is defined by the variables F1_ST and F1_SP or F2_ST and F2_SP. The bandwidth for each of these signals is embedded into the values assigned to the variables. The variables are used in EQUATIONS 1-8 which define the third and fifth order lower and upper frequencies. The third and fifth order lower and upper frequencies are then compared to the fixed regions.

Figure 10:
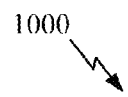
FIG. 10 is a table mapping region index combinations of intermodulation distortion products to a maximum power reduction value according to aspects of the present disclosure.

FIG. 10 shows an exemplary region index combination and maximum specified backoff. Referring to table 1000, according to an aspect of the present disclosure, a particular maximum power reduction 1002 is listed (in dB) for each combination in a list of different region index combinations. The first column 1004 represents the region index corresponding to the lower fifth order intermodulation product, the second column 1006 represents the region index corresponding to the lower third order intermodulation distortion product, the third column 1008 represents the region index corresponding to the upper third order intermodulation distortion product, and the fourth column 1010 represents the region index corresponding to the upper fifth order intermodulation distortion product. For example, a waveform having intermodulation distortion products with a region index combination of 3-0-3-3 would be assigned a power back off of 2.57 dB.

The power backoff for waveforms transmitted by a UE, which have the same region indices, may not be the same. For example, an error between the maximum power reduction and specified backoff may be between 2 dB and 5 dB depending on resource block ratio, distance from edge, and/or separation between clusters. To reduce the aforementioned errors, additional rules (i.e., mappings) may be specified to define the maximum power reduction for two-cluster transmissions having an unbalanced resource block ratio between clusters.

Figure 11:
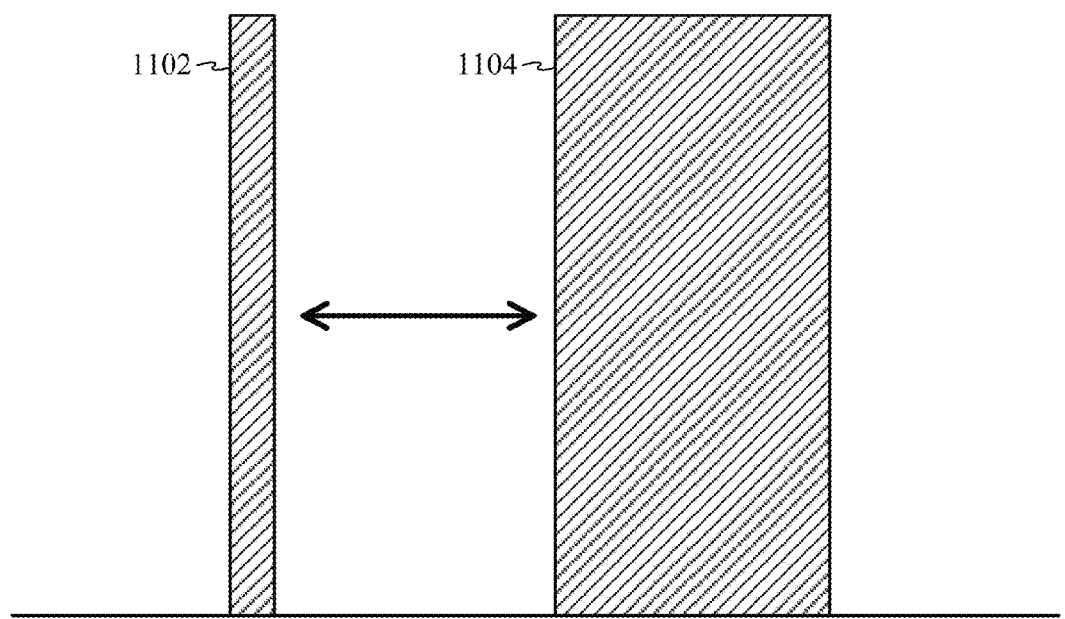
FIG. 11 is a diagram illustrating an unbalanced multi-cluster transmission.

The additional rules (i.e., a mapping different from FIG. 10) may be applied for unbalanced clusters 1102, 1104, as shown in FIG. 11. For two clusters carrying a combined total of twenty resource blocks, the additional rules may be applied when the resource block ratio is between 1:19 and 4:16. That is, the additional rules for unbalanced clusters 1102, 1104 may be applied if one of the unbalanced clusters 1102 has less than five resource blocks out of the twenty total resource blocks of both clusters. In one configuration, the rule may only be applied to clusters with twenty or more resource blocks because the improvements to the system may not be achieved for clusters with less than twenty resource blocks. Of course, the aspects of the present disclosure are not limited to clusters with twenty or more resource blocks.

Figure 12:
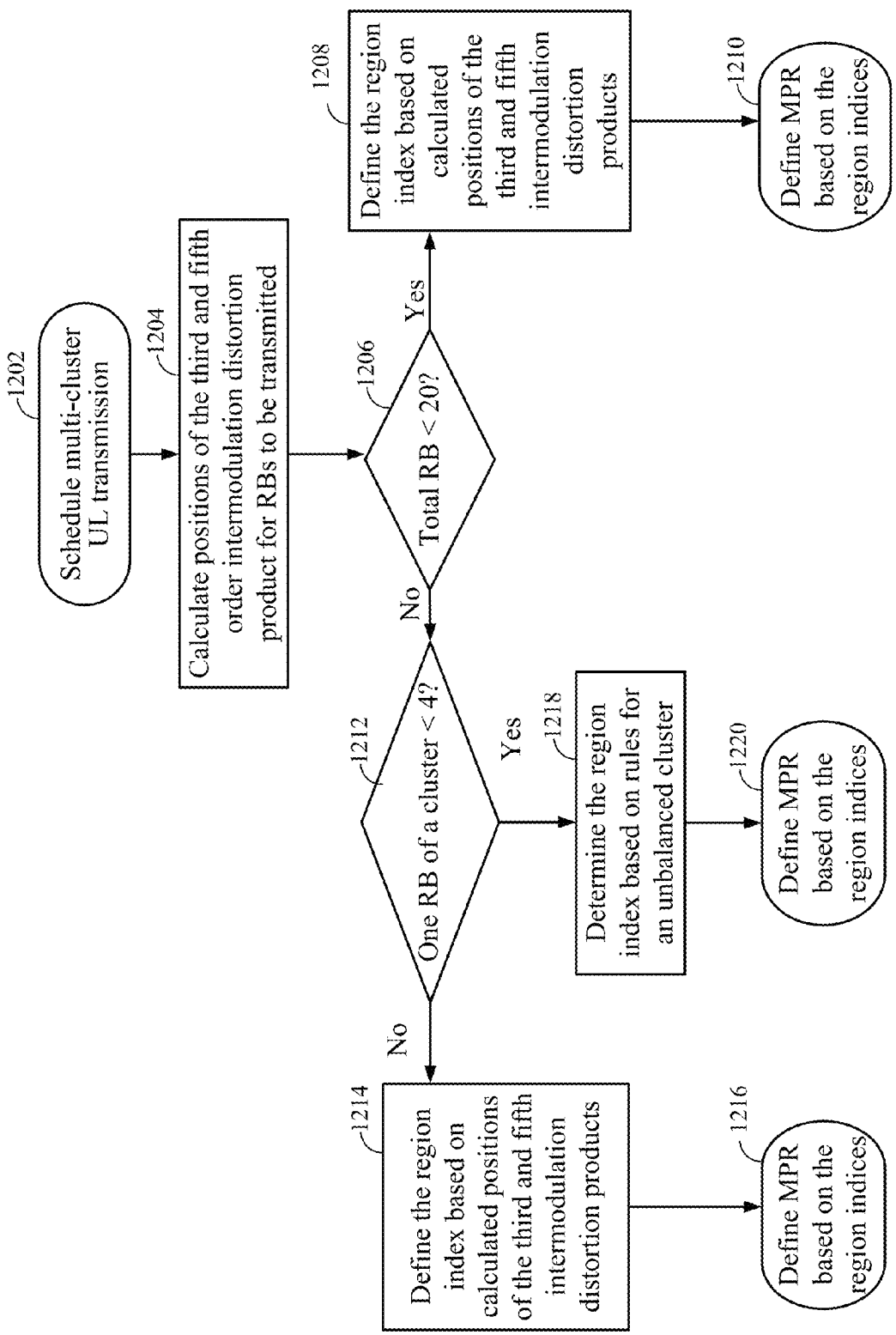
FIG. 12 is a flow diagram illustrating a method of defining MPR depending on total number of resource blocks (RBs) for balanced and unbalanced clusters according to an aspect of the present disclosure.

A method of defining the applied maximum power reduction depending on the total number of resource blocks (RBs) for balanced and unbalanced clusters according to an aspect of the present disclosure is described with reference to FIG. 12. In block 1202, an eNodeB schedules a multi-cluster uplink transmission for a UE. In one configuration, the multi-cluster uplink transmission is a two-cluster uplink transmission, the modulation and coding scheme (MCS) is QPSK, and the total bandwidth is 20 MHz. In block 1204, the UE calculates the position of the third and fifth order intermodulation distortion products for the resource blocks to be transmitted. Furthermore, in block 1206, the UE determines whether the total number of resource blocks is less than twenty. If the total number of resource blocks is less than twenty, the UE defines region indices based on the calculated positions of the third and fifth intermodulation distortion products in block 1208 and defines the maximum power reduction based on the region indices in block 1210.

In one configuration, when the total number of resource blocks is equal to or greater than twenty, then the UE determines whether one of the two clusters has less than four resource blocks in block 1212. If neither of the two clusters has less than four resource blocks, the UE defines the region indices based on the calculated positions of the third and fifth intermodulation distortion products in block 1214 and defines the maximum power reduction based on the region indices in block 1216. If one of the two clusters has less than four resource blocks, the UE determines the region indices based on the aforementioned rules for unbalanced clusters in block 1218 and defines the maximum power reduction based on the region indices in block 1220.

Figure 13:
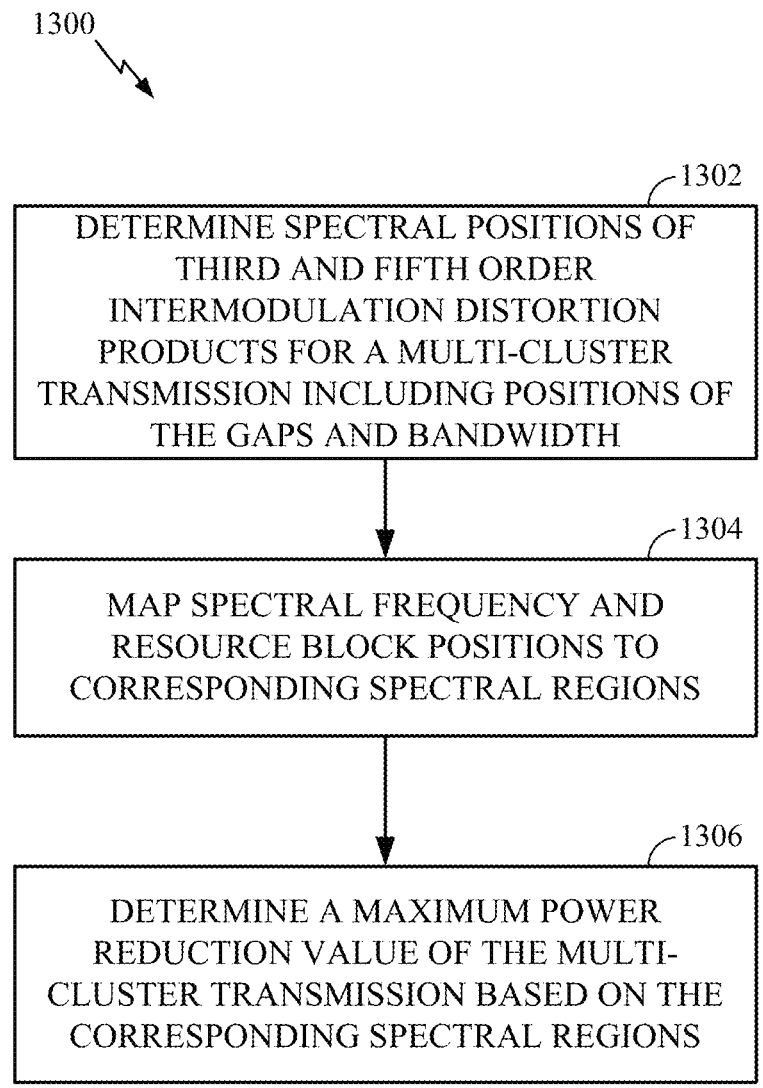
FIGS. 13 and 14 are flow diagrams illustrating methods for power control in wireless systems according to aspects of the present disclosure.

FIG. 13 illustrates a method 1300 of wireless communication according to aspects of the present disclosure. In block 1302, a UE determines spectral positions of third and fifth order intermodulation distortion products for a multi-cluster transmission. The determined positions may also include the gaps and bandwidth for the intermodulation distortion products. In block 1304, the UE maps the spectral positions of frequencies and resource blocks to corresponding spectral regions. The UE may also map the spectral positions of the gaps and bandwidth for the intermodulation distortion products. In block 1306, the UE determines a maximum power reduction value of the multi-cluster transmission based on the corresponding spectral regions.

Figure 14:
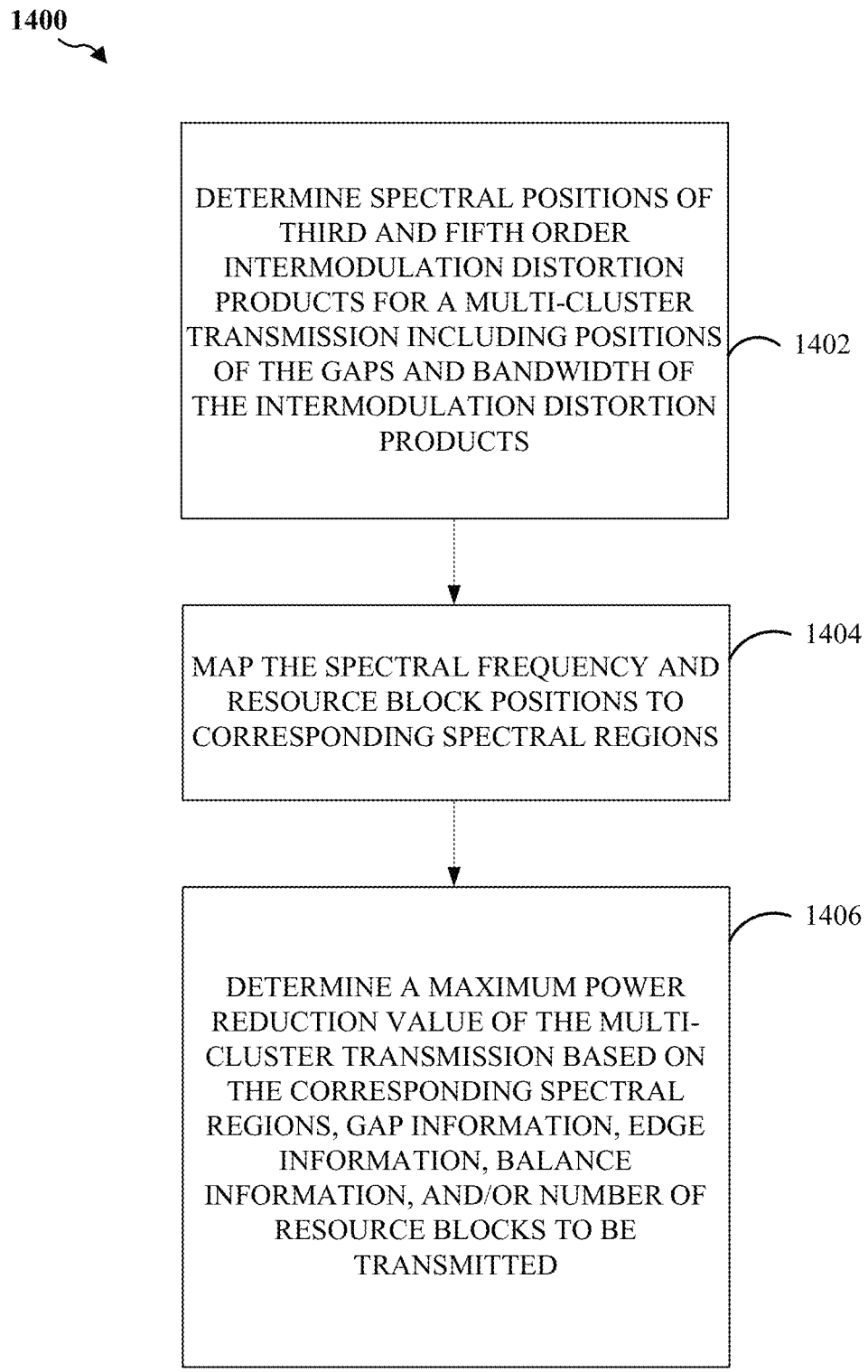

FIG. 14 illustrates a method 1400 of wireless communication according to aspects of the present disclosure. In block 1402, a UE determines determine spectral positions of third and fifth order intermodulation distortion products for a multi-cluster transmission including positions of the gaps and bandwidth of the intermodulation distortion products. The UE may also determine the positions of the gaps and bandwidth for the multi-cluster transmission. In block 1404, the UE maps the spectral frequencies and resource block positions to corresponding spectral regions. In block 1406, the UE determine a maximum power reduction value of the multi-cluster transmission based on the corresponding spectral regions, gap information, edge information, balance information, and/or number of resource blocks to be transmitted.

Figure 15:
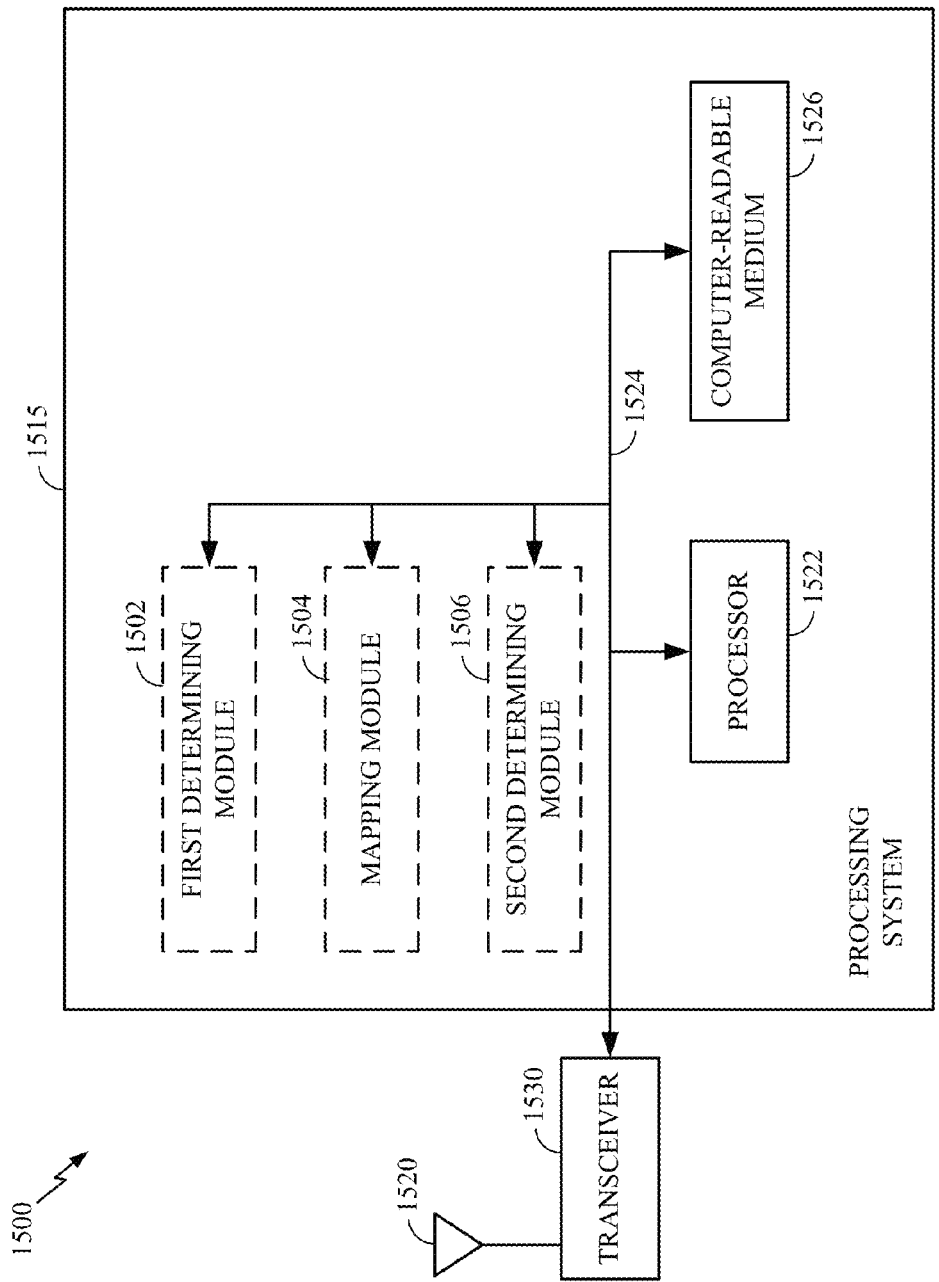
FIG. 15 is a diagram illustrating an example of a hardware implementation for an apparatus employing a power control system according to one aspect of the disclosure.

FIG. 15 is a diagram illustrating an example of a hardware implementation for an apparatus 1500 employing a power control system 1515 according to one aspect of the disclosure. The power control system 1515 may be implemented with a bus architecture, represented generally by a bus 1524. The bus 1524 may include any number of interconnecting buses and bridges depending on the specific application of the power control system 1515 and the overall design constraints. The bus 1524 links together various circuits including one or more processors and/or hardware modules, represented by a processor 1526, a first determining module 1502, a mapping module 1504, a second determining module 1506, and a computer-readable medium 1528. The bus 1524 may also link various other circuits such as timing sources, peripherals, voltage regulators, and power management circuits, which are well known in the art, and therefore, will not be described any further.

The apparatus 1500 includes the power control system 1515 coupled to a transceiver 1522. The transceiver 1522 is coupled to one or more antennas 1520. The transceiver 1522 communicates with various other apparatus over a transmission medium. The power control system 1515 includes the processor 1526 coupled to the computer-readable medium 1528. The processor 1526 is responsible for general processing, including the execution of software stored on the computer-readable medium 1528. The software, when executed by the processor 1526, causes the power control system 1515 to perform the various functions described supra for any particular apparatus. The computer-readable medium 1528 may also be used for storing data that is manipulated by the processor 1526 when executing software.

The power control system 1515 further includes a first determining module 1502 that determines spectral positions of intermodulation distortion products for a multi-cluster transmission. The first determining module 1502 receives the intermodulation distortion products from the processor 1526. The power control system 1515 also includes a mapping module 1504 that maps the spectral positions corresponding to the spectral regions. The mapping module 1504 forwards the spectral positions to a second determining module 1506. The second determining module 1506 determines a maximum power reduction value of the multi-cluster transmission based on the corresponding spectral region. In one configuration, the first determining module 1502 and the second determining module 1506 may be a single module (not shown). Additionally, the first determining module 1502, the mapping module 1504 and the second determining module 1506 may be software modules running in the processor 1526, resident/stored in the computer-readable medium 1528, one or more hardware modules coupled to the processor 1526, or some combination thereof. The power control system 1515 may be a component of the UE 650 and may include the memory 660 and/or the controller/processor 659, for example, as shown in FIG. 6.

In one configuration, the apparatus 1500 for wireless communication includes means for determining. The determining means may include the first determining module 1502, the second determining module 1506, the power control system 1515, the controller/processor 659, and/or the memory 660 configured to perform the functions recited by the determining means. In another configuration, the determining means may be any module or any apparatus configured to perform the functions recited by the determining means.

In one configuration, the apparatus 1500 for wireless communication includes means for mapping. The mapping means may include the mapping module 1504, the power control system 1515, the controller/processor 659, and/or the memory 660 configured to perform the functions recited by the mapping means. In another configuration, the mapping means may be any module or any apparatus configured to perform the functions recited by the mapping means.

The examples above describe aspects implemented in an LTE/-A system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. A method of wireless communication, comprising:
  determining spectral positions of intermodulation distortion products for a multi-cluster transmission;
  mapping the spectral positions to corresponding spectral regions;
  determining a maximum power reduction value of the multi-cluster transmission based at least in part on the corresponding spectral regions and whether the multi-cluster transmission includes a balanced number of resource blocks based at least in part on a predetermined resource block ratio threshold, the maximum power reduction value further determined from:
    a first mapping of region indices when the multi-cluster transmission includes the balanced number of resource blocks; or
    a second mapping of region indices when the multi-cluster transmission includes an unbalanced number of resource blocks; and
  applying the determined maximum power reduction value to uplink transmissions at a user equipment to maintain a specified quality of service (QoS) and a transmission power limit.
2. The method of claim 1, in which the mapping further comprises mapping the spectral positions of at least one gap and a bandwidth of each intermodulation distortion product.

3. The method of claim 1, further comprising:
determining boundaries of the spectral positions, and
in which the mapping is based at least in part on the boundaries of the spectral positions.

4. The method of claim 3, in which the mapping further comprises mapping frequencies and resource blocks.

5. The method of claim 1, further comprising:
determining a combination of the spectral regions corresponding to at least one of a third order intermodulation distortion product, or a fifth order intermodulation distortion product, for the multi-cluster transmission; and
determining the maximum power reduction value based on the combination.

6. The method of claim 1, further comprising defining the spectral regions based at least in part on a number of resource blocks associated with the multi-cluster transmission.

7. An apparatus for wireless communication, comprising:
a memory; and
at least one processor coupled to the memory, the at least one processor being configured:
to determine spectral positions of intermodulation distortion products for a multi-cluster transmission;
to map the spectral positions to corresponding spectral regions;
to determine a maximum power reduction value of the multi-cluster transmission based at least in part on the corresponding spectral regions and whether the multi-cluster transmission includes a balanced number of resource blocks based at least in part on a predetermined resource block ratio threshold, the maximum power reduction value further determined from:
a first mapping of region indices when the multi-cluster transmission includes the balanced number of resource blocks; or
a second mapping of region indices when the multi-cluster transmission includes an unbalanced number of resource blocks; and
to apply the determined maximum power reduction value to uplink transmissions at a user equipment to maintain a specified quality of service (QoS) and a transmission power limit.

8. The apparatus of claim 7, in which the at least one processor is further configured to map the spectral positions of at least one gap and a bandwidth of each intermodulation distortion product.

9. The apparatus of claim 7, in which the at least one processor is further configured:
to determine boundaries of the spectral positions; and
to map the spectral positions to the corresponding spectral regions based at least in part on the boundaries of the spectral positions.

10. The apparatus of claim 9, in which the at least one processor is further configured to map frequencies and resource blocks.

11. The apparatus of claim 7, in which the at least one processor is further configured:
to determine a combination of the spectral regions corresponding to at least one of a third order intermodulation distortion product, or a fifth order intermodulation distortion product, for the multi-cluster transmission; and
to determine the maximum power reduction value based on the combination.

12. The apparatus of claim 7, in which the at least one processor defines the spectral regions based at least in part on a number of resource blocks associated with the multi-cluster transmission.

13. An apparatus operable for wireless communication, comprising:
means for determining spectral positions of intermodulation distortion products for a multi-cluster transmission;
means for mapping the spectral positions to corresponding spectral regions;
means for determining a maximum power reduction value of the multi-cluster transmission based at least in part on the corresponding spectral regions and whether the multi-cluster transmission includes a balanced number of resource blocks based at least in part on a predetermined resource block ratio threshold, the maximum power reduction value further determined from:
a first mapping of region indices when the multi-cluster transmission includes the balanced number of resource blocks; or
a second mapping of region indices when the multi-cluster transmission includes an unbalanced number of resource blocks; and
means for applying the determined maximum power reduction value to uplink transmissions at a user equipment to maintain a specified quality of service (QoS) and a transmission power limit.

14. The apparatus of claim 13, further comprising:
means for determining boundaries of the spectral positions; and
means for mapping the spectral positions to the corresponding spectral regions based at least in part on the boundaries of the spectral positions.

15. The apparatus of claim 13, further comprising:
means for determining a combination of the spectral regions corresponding to at least one of a third order intermodulation distortion product or a fifth order intermodulation distortion product, for the multi-cluster transmission; and
means for determining the maximum power reduction value based on the combination.

16. A computer program product operable for wireless communication, the computer program product comprising:
a non-transitory computer-readable medium having program code recorded thereon and being executable by instructions residing in a computer, the program code comprising:
program code to determine spectral positions of intermodulation distortion products for a multi-cluster transmission;
program code to map the spectral positions to corresponding spectral regions;
program code to determine a maximum power reduction value of the multi-cluster transmission based at least in part on the corresponding spectral regions and whether the multi-cluster transmission includes a balanced number of resource blocks based at least in part on a predetermined resource block ratio threshold, the maximum power reduction value further determined from:
a first mapping of region indices when the multi-cluster transmission includes the balanced number of resource blocks; or
a second mapping of region indices when the multi-cluster transmission includes an unbalanced number of resource blocks; and
program code to apply the determined maximum power reduction value to uplink transmissions at a user equipment to maintain a specified quality of service (QoS) and a transmission power limit.

17. The computer program product of claim 16, in which the program code further comprises:
   program code to determine boundaries of the spectral positions; and
   program code to map the spectral positions to the corresponding spectral regions based at least in part on the boundaries of the spectral positions.

18. The computer program product of claim 16, in which the program code further comprises:
   program code to determine a combination of the spectral regions corresponding to at least one of a third order intermodulation distortion product or a fifth order intermodulation distortion product, for the multi-cluster transmission; and
   program code to determine the maximum power reduction value based on the combination.

* * * * *